R. E. HELLMUND.
SYSTEM OF ALTERNATING CURRENT RECUPERATIVE CONTROL.
APPLICATION FILED APR. 29, 1915.
1,320,048.
Patented Oct. 28, 1919.
2 SHEETS—SHEET 1.
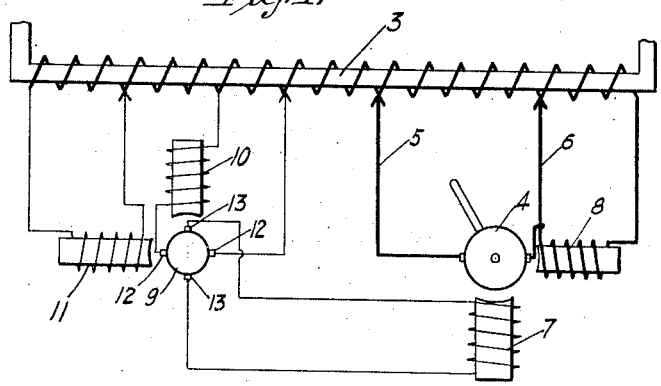
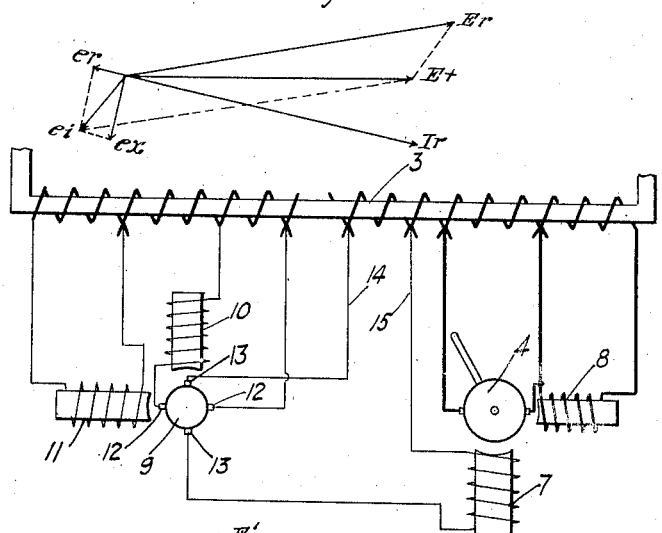
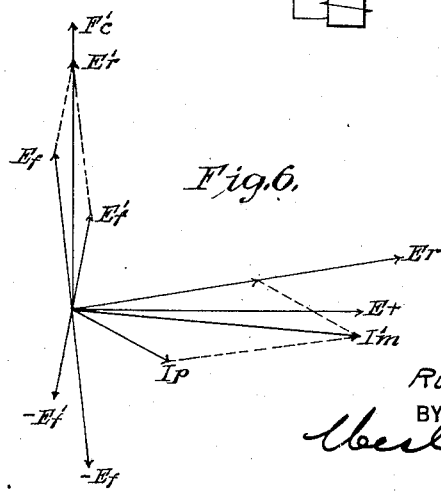
WITNESSES:
INVENTOR
Rudolf E. Hellmund.
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF ALTERNATING-CURRENT RECUPERATIVE CONTROL.

1,320,048.     Specification of Letters Patent.     Patented Oct. 28, 1919.

Application filed April 29, 1915. Serial No. 24,733.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Alternating-Current Recuperative Control, of which the following is a specification.

My invention relates to systems of conversion and control for single-phase alternating currents, and it has for an object to provide circuits and apparatus whereby alternating current may be derived from a source that shall have the same frequency as the current in said source but shall differ therefrom by a definite, and substantially constant, angle of phase displacement.

Another object of my invention is to provide circuits and apparatus whereby the motors of a single-phase alternating-current railway vehicle may be properly excited to effect positive and adjustable regeneration.

In my copending application, Serial No. 23,361, filed April 23, 1915, patented Dec. 10, 1918, No. 1,287,013, and assigned to the Westinghouse Electric & Manufacturing Company, I have disclosed a system of operation for single-phase alternating-current railway systems wherein one motor of a railway vehicle is connected to operate as an exciting machine for supplying quadrature current to the remaining motors for regenerative operation. In the system of said application, it is necessary that the exciting machine be driven by an outside source, such, for example, as the car axle. By my invention, I provide an exciting machine of special character which is self-propelling and which provides current of proper phase relation for the exciting of the regenerating machines.

Figure 3:
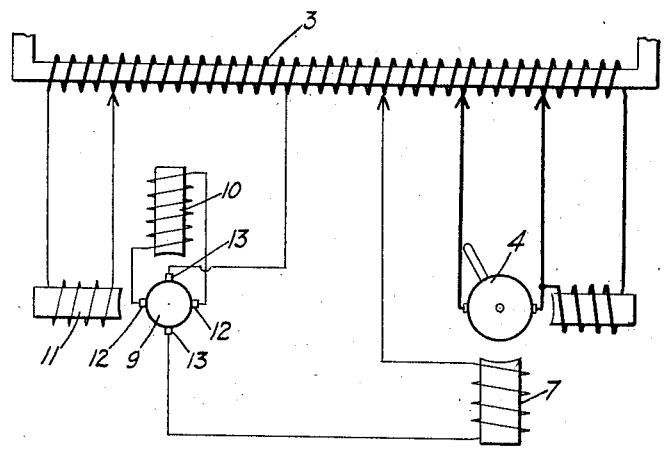
Figure 4:
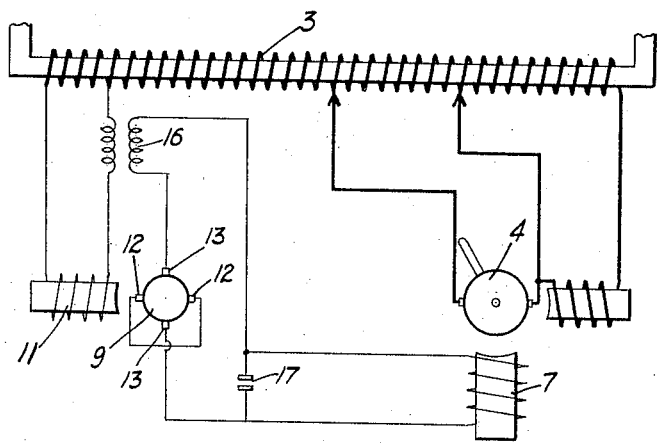

Referring to the accompanying drawings, Figure 1 is a diagrammatic view of the electrical equipment of a railway vehicle embodying one form of my invention; Figs. 2, 3 and 4 are diagrammatic views of a modification of the electrical equipment shown in Fig. 1; and Figs. 5 and 6 are vector diagrams illustrating the operation of portions of the systems shown in the preceding figures.

Referring to Fig. 1, 3 is any source of single-phase alternating current, such, for example, as the step-down transformer of a railway vehicle. A propulsion motor 4 of the series commutating type is connected to derive current from the source 3 through suitable adjustable taps 5 and 6. The motor 4 is provided with a main field winding 7 and with a cross field winding 8. A commutator-type exciting machine 9 is connected to derive current from the source 3 and is provided with a main field winding 10 and with a cross field winding 11. Main brushes 12 are mounted in quadrature to the axis of the main field winding 10 and serve for motor operation. Auxiliary brushes 13—13 bear upon the commutator of the machine 9 in quadrature to the brushes 12 and are connected to the terminals of the main field winding 7 of the machine 4 by suitable leads. The cross field winding 11 of the machine 9 is connected to the source 3 through suitable adjustable taps.

Having described the structure of my invention, the operation is as follows: Current derived from the source 3 is permitted to flow through the main field winding 10 and the armature of the machine 9 by way of the brushes 12—12 and causes the armature to rotate as in the ordinary series commutating motor. Commutation will be controlled in the ordinary manner by means of the winding 11. The rotation of the armature conductors in inductive relation to the cross field winding 11 will generate a rotational electromotive force, and a closed circuit is furnished for this electromotive force via the auxiliary brushes 13—13 and the main field winding 7 of the machine 4. Exciting current having the proper quadrature relation will therefore be derived from the machine 9 and supplied to the winding 7 so that the motor 4 may operate as a regenerating machine to supply energy to the source 3 from the car axle.

The use of a phase-converter of the self-propelled type in connection with a highly inductive load, as above disclosed, is particularly advantageous as, under these conditions, the different factors so coact as to demand but little corrective voltage for the production of the proper power-factor in the main load.

On account of the peculiar combination of the inductive output current of the converter and the motor input current thereof, the proper phase relation for the magnetizing current of the main machine is produced in the following manner, the inductive load current of the converter serving partially as magnetizing current therefor.

In the vector diagram of Fig. 5, the generator voltage of the main machine is designated, in direction and in magnitude, by the vector E$t$. The recuperative current is shown by the vector I$r$ and is preferably lagging, as demanded for power-factor correction of the supply circuit. e$r$, e$x$ and e$i$ are the ohmic reactive and impedance drops respectively produced by the recuperative load current, and the vector combination of $-$e$i$ with the vector E$t$ produces the vector E$r$, indicating the rotational voltage of the main recuperative machine.

The vectors E$t$ and E$r$ from Fig. 5 are reproduced in the diagram of Fig. 6. The magnetizing current of the field-magnet winding 7 of the main machine is indicated by the vector I$f$ in phase with the vector E$r$. The voltage impressed upon said magnetizing-field winding to produce the current I$f$ must lead said current in phase by somewhat less than 90° and is, therefore, indicated by the vector E$f$. The motor or driving current of the phase-converter is represented by a vector I$p$ lagging considerably behind the transformer voltage. By combining the vector I$p$ and I$f$, there is obtained the resultant magnetizing current I'$m$ of the exciter machine along the axis of the brushes 13—13. The field set up by this current produces a voltage $-$E$f'$, demanding an impressed voltage E$f'$ leading the vector I'$m$ slightly less than 90°. By combining E$f$ and E$f'$, there is obtained the rotational voltage E$r'$ produced by the field 11. This field is 90° out of phase with the transformer voltage, as indicated.

Referring to the form of my invention shown in Fig. 2, the general connections are the same as in Fig. 1, with the exception that taps 14 and 15 are connected in the circuit between the armature of the machine 9 and the main field winding 7 of the machine 4. An electromotive force derived from the source 3 is injected into the exciting circuit, therefore, for the control of the phase and of the amount of regenerated current from the machine 4 in accordance with the principles laid down in my copending application, Serial No. 19,460, filed Apr. 6, 1915, and assigned to the Westinghouse Electric & Manufacturing Company. It is necessary to split the secondary winding 3 of the supply transformer into two distinct portions, as shown, connecting the brushes 12—12 to one section and the brushes 13—13 to the other section. Otherwise, a condition approximating short circuit will be obtained in the winding of the armature 9 between the brushes 12—12 and 13—13.

The transformer action of the cross field winding 11 upon the armature conductors lying under the brushes 13 sets up a current which may be used for main field excitation, as shown in the circuit of Fig. 3. The main field winding 10 is entirely disconnected from the source 3 and is connected across the brushes 12—12, deriving its excitation current solely from the above-mentioned transformer electromotive force. Current derived from the rotational electromotive force of the conductors under the brushes 12—12, developed by cutting the field of the winding 9, is supplied to the main field winding 7 of the machine 4, as in Figs. 1 and 2.

I find that it is unnecessary to supply the machine 9 with a distinct main field winding. I may provide a main field in a manner similar to that employed in the well known Winter-Eichberg motor. I have illustrated this type of device in Fig. 4 wherein the exciting machine comprises an armature 9 provided with brushes 12—12 which are short circuited upon each other and with brushes 13—13 lying in a quadrature relation thereto. The cross field winding 11 is connected to the source 3 and is arranged in line with the brushes 12—12. The brushes 13—13 are connected to the main field winding 7 of the machine 4 through the secondary winding of a transformer 16, the primary winding of which is inserted in one of the leads of the cross field winding 11. The operation of this device is as follows: Upon closing the circuit, the field winding 11 induces armature current in the conductors lying between the brushes 12—12, said armature current flowing through the short-circuit connections of said brushes. Starting current is induced in the secondary winding of the transformer 16 and flows through the armature 9 between the brushes 13—13, establishing a main field for coaction with the armature current induced by the winding 11. The exciting machine thereupon starts and runs as a motor and, at the same time, current may be derived from the brushes 13—13 for the winding 7 and having the proper phase relation for the excitation of the machine 4. It will thus be seen that there is a simultaneous motor and generator action in the exciting machine, and the well known advantages of the Winter-Eichberg motor, such, for example, as good commutation and good power factor are also obtained to a marked degree. A switch 17 may be provided, if desired, to short circuit the winding 7 from the circuit during the starting of the auxiliary exciter machine.

While I have described my invention in four specific embodiments, it will be obvious to those skilled in the art that it is susceptible of various minor modifications and changes without departing from the spirit thereof. I desire, therefore, that only such limitations shall be placed thereupon as are set forth in the appended claims or are imposed by the prior art.

I claim as my invention:

1. The combination with a dynamo-electric machine of the single-phase commutator type provided with means for producing exciting and inducing fields, of means for deriving a circuit from points in the armature thereof in electrical alinement with said exciting field, means for inductively loading said circuit, whereby current is supplied to said derived circuit of such phase as to aid in the excitation of said dynamo-electric machine, and means for energizing said inducing field independently of the inductive-load current.

2. The combination with a dynamo-electric machine of the single-phase commutator type provided with inducing and exciting stator windings and having brushes in electrical alinement with said exciting field winding, of inductive means connected between said brushes, whereby, if current be supplied to said stator windings, current flows through said brushes of such phase as to aid in the excitation of said machine, and means for energizing said inducing field winding independently of the load current flowing through said inductive means.

3. The combination with a source of alternating current, of a dynamo-electric machine of the commutator type connected thereto and provided with exciting and inducing field windings and with brushes in electrical alinement with said exciting field winding, inductive means connected between said brushes, whereby, if current be supplied to said stator windings from said source, current of displaced phase may be derived from said brushes, said current being of such phase as to assist in the excitation of said machine, and means for energizing said inducing field winding independently of the flow of current of displaced phase.

In testimony whereof, I have hereunto subscribed my name this 23rd day of April, 1915.

RUDOLF E. HELLMUND.

Copies of this patent may be obtained for five cents each, by addressing the "Commissioner of Patents, Washington, D. C."